Nov. 18, 1952     O. J. B. ORWIN     2,618,370
ROLLER CONVEYER
Filed Nov. 16, 1949
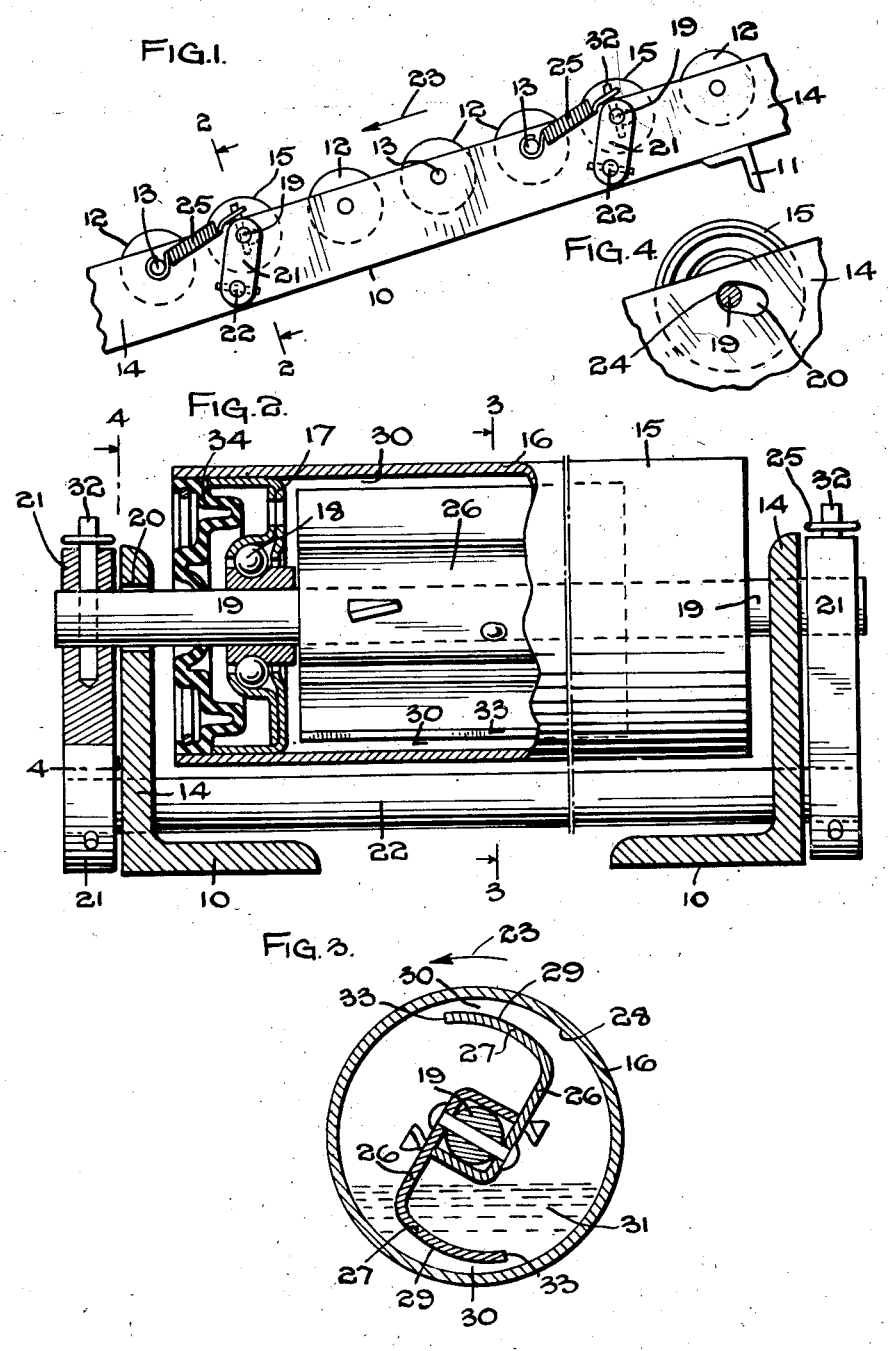
INVENTOR:
Olaf John Barclay Orwin
by Richardson, David and Nordon
Atty's Patented Nov. 18, 1952

2,618,370

UNITED STATES PATENT OFFICE 2,618,370

ROLLER CONVEYER

Olaf John Barclay Orwin, Erdington, Birmingham, England, assignor to Fisher & Ludlow Limited, Birmingham, England, a British company Application November 16, 1949, Serial No. 127,620
In Great Britain November 19, 1948

7 Claims. (Cl. 193—35)

This invention relates to roller conveyors such conveyors consisting essentially of a large number of roller elements disposed in closely spaced parallel or substantially parallel relationship and mounted for rotation generally through the medium of some form of anti-friction bearing upon a stationary supporting structure which is disposed at such an inclination to the horizontal as to ensure that when the load to be transported is placed on the upper end of the conveyor run thereby provided, it will be displaced gravitationally to the lower end of the run so as to transport the load from one desired position to another.

Such conveyors possess the great advantage that no motive power has to be supplied for the purpose of operating the conveyor but as hitherto constructed they have suffered from the fundamental disadvantage that the static friction to be overcome in starting the load initially from rest is substantially greater than the rotational and rolling friction, which together with the momentum which has to be imparted to the roller elements in starting these from rest are the only factors retarding the gravitational acceleration of the load once this has commenced to move with appreciable velocity.

In consequence, where the angle of inclination to the horizontal or the design of the bearings for the roller elements is so chosen as to ensure that the load will start from rest when placed on the conveyor without the operator having to push it, the terminal velocity of the load particularly on a long conveyor run is liable to be unduly high even when the mass of the load is relatively low so that damage to individual loads in consequence, for example, of collisions between two loads or in consequence of a load passing completely off the lower end of the conveyor run may occur.

This disadvantage becomes increasingly serious as the mass of the load increases, as the initial static friction remains substantially the same while there is correspondingly little change in the retarding rolling and rotational frictional forces, while the mass of the load may be increased out of all proportion to the mass of the roller elements so that the momentum which has to be imparted to the roller elements becomes negligible in comparison with the momentum which is acquired by the load. This disadvantage is especially serious where a large number of loads of substantial mass are following one another at small intervals down the conveyor run so that the rollers do not have time to retard appreciably between successive loads, and the retarding factor arising from the momentum absorbed by the rollers becomes virtually of no account.

Thus in dealing with large masses it becomes most difficult indeed to control terminal velocity of the loads.

The present invention has for its object the provision of an improved form of roller conveyor in which these fundamental disadvantages are avoided.

According to the present invention some or all of the roller elements are provided with a surface adapted to partake of the rotational movement of the elements and adapted each to co-act with a further surface provided on the stationary supporting structure, a liquid being interposed between each such two co-acting surfaces, said surfaces being so spaced in relation to one another and said liquid having a viscosity such as together to offer a resistance to relative movement between the two surfaces which increases with increase of relative velocity between the two co-acting surfaces in such a manner as to inhibit rotative acceleration of the associated roller element.

Where the maximum mass of each load to be transported is relatively low only some of the roller elements would have surfaces adapted to co-operate with further surfaces as above described, for example, every fourth roller element might be so adapted.

Where however the maximum mass of the load to be transported is substantial, say of the order of 3 or 4 tons, each roller element would be so adapted.

Referring to the drawings:

Figure 1 is a side elevation of part of a roller conveyor embodying the present invention.

Figure 2 is a sectional view on the line 2—2 of Figure 1.

Figures 3 and 4 are sectional views on the lines 3—3 and 4—4 of Figure 2.

In the drawings, the invention is shown as applied to a roller conveyor of generally conventional form such conveyor consisting essentially of a pair of spaced parallel longitudinal members 10 connected together by cross members 11, the members 10 being of angle form in cross section and supporting rotatably a large number of rollers which are disposed in parallel or substantially parallel relationship and spaced apart closely longitudinally of the conveyor.

In the particular construction illustrated in the drawing three of every four rollers, namely, the rollers indictaed at 12 are of conventional form and constitute idle rollers, such rollers being mounted rotatably in the known manner upon spindles 13 the ends of which are supported in the vertical flanges 14 of the angle section longitudinal members 10.

With the present invention, however, every fourth roller in the particular construction illustrated constitutes a retarding roller as indicated at 15 and each such retarding roller is of hollow form consisting of a cylindrical metal shell 16 closed at each end by closure members 17 of dished annular form, in each of which is housed an anti-friction bearing 18 whereby each retarding roller is supported rotatably from a spindle 19, the extremities of each of which spindles extend freely through slots 20 provided in the aforesaid flanges 14, the spindles 19 projecting beyond the flanges and being mounted on the free ends of arms 21 which arms are supported rigidly upon opposite ends of a shaft 22, which shaft extends parallel to but below the corresponding roller 15 and is mounted pivotally in openings in the lower part of each of the flanges 14.

The conveyor is disposed at an inclination to the horizontal as will be apparent from Figure 1 so that the goods to be conveyed are displaced gravitationally along the conveyor in the direction of the arrow 23 and each of the spindles 22 are disposed on the forward side of the axis of rotation of the corresponding roller 15 in relation to the direction of advancement of the goods.

The slots 20 in which the spindles 19 work are substantially tangential in relation to the axis of the corresponding spindle 22 and each spindle 19 is spring urged in an upward and forward direction into abutment with the upward and forward edge 24 of its slot, as is shown most clearly in Figure 4 by means of a tension spring 25 disposed one at each end of each spindle 19 and connected at one extremity to the upper end of the corresponding arm 21 and at the other extremity to the end of the next idle roller spindle 13 which is situated forwardly in relation to the retarding roller 15.

The length and position of each of the slots 20 is such that when the conveyor is not loaded the upper side of each of the retarding rollers 15 is slightly higher than the upper side of each idle roller 12 in relation to the longitudinal members 10, thus ensuring that despite possible imperfections in manufacture each retarding roller 15 will operatively engage with the goods to be retarded as they advance down the conveyor.

Mounted non-rotatably on the medial part of each retarding roller spindle 19 is a pair of vanes 26 the extremities 27 of which are curved forwardly in relation to the direction of rotation of the roller shell 16 which is indicated by the arrow in Figure 3. The vane ends 27 are further disposed at an inclination to the inner surface 28 of the cylindrical roller shell so that the outer surfaces 29 of the vane ends cooperate with the inner surface 28 in forming therebetween a passage or space 30 whose cross section decreases in the direction of rotation of the roller shell 16.

The roller shell is filled partially with oil or other suitable viscous liquid as indicated at 31 and the spindle 19 together with the vanes 26 thereon of each retarding roller is held rigidly against rotation by pegs 32 which connect the spindle to the arms 21, while the roller shell 16 is quite free to rotate in relation to the spindle 19.

The tip 33 of each vane is disposed a relatively small distance, say of the order of 1/8 or 1/16 of an inch from the inner surface 28 of the shell 16 and it will be understood from the foregoing description that the outer surface 29 of each vane end constitutes a surface which is stationary in relation to the conveyor structure supporting the rollers, which surface by virtue of the converging cross section of the passages 30 co-acts with the interior surface 28 of each retarding roller 15 in cooperation with the oil 31 in resisting acceleration of each roller 15, if this is subjected to the impact of a load moving with appreciable velocity. The retarding force thus provided increases substantially with increase in the rotational velocity of each roller 15, that is to say, with increase in relative speed between the rotating shell 16 and the stationary vanes 26.

The retarding force is very small with the arrangement described for low rotational velocities so that the retarding rollers 15 offer relatively little resistance to either a light or a heavy load initially placed thereon and starting thereon from rest, while where the load is very light and is not very substantially greater than the mass of any one retarding roller 15, the momentum transferred from such moving light load to each retarding roller 15 is relatively small and the resultant velocity of the retarding roller is low and the retarding force exerted thereon is correspondingly limited.

Where, however, the load is heavy or a large number of loads of moderate as well as of heavy weight are traversing the conveyor at close intervals, considerable momentum will be transferred initially from the load to each retarding roller assuming these to be initially at rest, with the result that each retarding roller will now possess an appreciable velocity and a substantial retarding force will then be exerted in the manner described on the inner surface 28 of each retarding roller shell, which retarding force increases substantially with increase of roller velocity, with the result that the retarding rollers are prevented from attaining too high a speed and are effective in retarding single heavy or a succession of heavy or moderate loads as above described.

The pivotal mounting of each retarding roller spindle 19 provided by the pivotally mounted arms 21 ensures that, as the goods pass over each roller 15 in turn, the goods by their mass will depress each roller rearwardly and downwardly against the pressure of the springs 25 which are made of relatively light construction, thus ensuring that the goods are not subjected to substantial bumping despite the fact that the upper surface of each roller 15 projects slightly above the upper surface of each of the rollers 12.

In the event, however, of heavy goods for example, a heavy crate or box, initially impinging on the upwardly projecting roller 15, the weight of the heavy goods tends to displace each roller 15 in a forward direction in relation to the longitudinal members 10 the couple produced by the rotation of each roller 15 and about the spindle 19 being transmitted through the viscous liquid so as to displace the roller together with the arms 21 about the spindle 22. In consequence the gravitational downward and rearward displacement of each roller 15 arising from the mass of the load is resisted and each roller 15 is retained in close engagement with the under side of the goods so as effectively to retard the same. It will be appreciated that increase in weight of the goods impinging on the upwardly-projecting roller 15 will increase the aforesaid couple so as more effectively to displace the roller 15 in an upward direction as relatively heavy goods initially impinge thereon, thereby ensuring during such initial impingement between the heavier goods and the roller 15 that the heavier goods are effectively engaged by the roller 15 and retarded.

The oil employed is preferably a heavy bodied oil having a high viscosity such as, for example, the oils which are used in large high torque slow running gear transmissions but the actual viscosity of the oil to be employed will be dependent upon the load to be carried and the angle of inclination of the conveyor run to the horizontal.

Each end of each hollow roller shell 16 is closed by an oil seal 34 for the purpose of preventing oil leakage.

From the above it will be seen that the present invention ensures that the terminal velocity of the load despite variations in its mass and frequency at all times does not exceed a predetermined maximum safe speed so that the disadvantages referred to which are associated with existing roller conveyors, are avoided.

What I claim then is:

1. In a roller conveyor of the kind comprising a plurality of roller elements mounted rotatably in substantially parallel relationship upon a supporting structure element disposed at an inclination to the horizontal, the provision of a plurality of hollow retarding roller elements mounted rotatably in spaced substantially parallel relationship on the supporting structure element, a vane disposed in each of said hollow retarding elements, means holding each of said vanes against rotation about the axes of rotation of their respective retarding elements in the direction of rotation of the same for a load passing down the conveyor, each of said retarding elements having internal surfaces adapted to coact with each vane therewithin, a liquid disposed within each retarding element, said liquid having a viscosity such as to offer a resistance to relative movement between the vanes and the coacting internal surfaces of each retarding element which resistance increases with increase of relative velocity between the vanes and the retarding elements so that rotative acceleration of said hollow retarding element is inhibited.

2. In a roller conveyor of the kind comprising a plurality of rollers mounted rotatably in substantially parallel relationship upon a supporting structure element disposed at an inclination to the horizontal, the provision of a retarding roller element mounted rotatably on the supporting structure element, vanes rigidly associated with each of one of said two elements adapted to coact with a surface provided on each of the other elements, a liquid being interposed between each of said vanes and the surface with which they coact, said liquid having a viscosity such as to offer a resistance to relative movement between the vanes and the surfaces with which said vanes coact, which resistance increases with increase of relative velocity between the vanes and the surfaces with which the vanes coact so that rotative acceleration of the said roller element is inhibited.

3. In a roller conveyor of the kind comprising a plurality of roller elements mounted rotatably in substantially parallel relationship upon a supporting structure element disposed at an inclination to the horizontal, the provision of a plurality of retarding roller elements mounted rotatably in spaced substantially parallel relationship on the supporting structure element, each of said retarding roller elements comprising a hollow cylindrical shell, a spindle extending longitudinally through the interior of said shell and connected at its ends non-rotatably to the supporting structure element, bearings supporting said shell for rotation concentrically with respect to said spindle, vanes mounted rigidly on each of said spindles within the interior of their respective shells, said vanes extending from said spindle towards the inner surface of said cylindrical shell, said vanes having their outer ends extending forwardly in relation to the normal direction of rotation of said shell and converging towards said shell but spaced therefrom at their extremities so as to provide between each vane and the inner surface of said cylindrical shell a passage of converging form in cross section, and a viscous liquid partially filling the interior of said hollow shell adapted to co-act with said vane extremities and shell interior in inhibiting rotative acceleration of said shell in consequence of the gravitational acceleration of the load traversing the conveyor.

4. In a roller conveyor of the kind comprising a plurality of roller elements mounted rotatably in substantially parallel relationship upon a supporting structure element disposed at an inclination to the horizontal, the provision of a plurality of retarding roller elements mounted rotatably in spaced substantially parallel relationship on the supporting structure element, said supporting structure element and each of said retarding elements having surfaces operably associated with their respective elements and adapted to coact with one another, a liquid interposed between each pair of relatively coacting surfaces, said liquid having a viscosity such as to offer a resistance to relative movement between the two coacting surfaces of each element, which resistance increases with increase of relative velocity between the two surfaces so that rotative acceleration of said hollow retarding element is inhibited, and said retarding roller elements being mounted for limited bodily movement in relation to the supporting structure element in a direction upwardly and forwardly in relation to the direction of gravitational advancement of the goods to be conveyed, said retarding roller elements being adapted to be displaced upwardly and forwardly by the impact of the goods thereon through a limited distance dependent upon the mass of the goods so as to increase the retarding effect of the retarding roller elements with increase in mass of the goods.

5. In a roller conveyor of the kind comprising a plurality of roller elements mounted rotatably in substantially parallel relationship upon a supporting structure element disposed at an inclination to the horizontal, the provision of a plurality of retarding roller elements mounted rotatably in spaced substantially parallel relationship on the supporting structure element, said supporting structure element and each of said retarding elements having surfaces operably associated with their respective elements and adapted to coact with one another, a liquid interposed between each pair of relatively coacting surfaces, said liquid having a viscosity such as to offer a resistance to relative movement between the coacting surfaces of each element, which resistance increases with increase of relative velocity between the two surfaces so that rotative acceleration of said retarding roller element is inhibited, said retarding roller elements being mounted rotatably on arms connected pivotally to the supporting structure element at a position situated below and forwardly in relation to the axis of rotation of the corresponding retarding roller having regard to the direction of gravitational advancement of the goods, and spring means controlling the pivotal movement of said arms and of the retarding roller elements supported therefrom.

6. In a roller conveyor of the kind comprising a plurality of roller elements mounted rotatably in substantially parallel relationship upon a supporting structure element disposed at an inclination to the horizontal, the provision of a plurality of retarding roller elements mounted rotatably in spaced substantially parallel relationship on the supporting structure element, each of said retarding roller elements comprising a hollow cylindrical shell, a spindle extending longitudinally through the interior of said shell and connected at its ends non-rotatably to the supporting structure element, bearings supporting said shell for rotation concentrically with respect to said spindle, vanes mounted rigidly on each of said spindles within the interior of their respective shells, said vanes extending from said spindle towards the inner surface of said cylindrical shell, said vanes having their outer ends extending forwardly in relation to the normal direction of rotation of said shell and converging towards said shell but spaced therefrom at their extremities so as to provide between each vane and the inner surface of said cylindrical shell a passage of converging form in cross section, a viscous liquid partially filling the interior of said hollow shell adapted to co-act with said vane extremities and shell interior in inhibiting rotative acceleration of said shell in consequence of the gravitational acceleration of the load traversing the conveyor, said retarding roller elements being mounted for limited pivotal movement in relation to the supporting structure element in a direction upwardly and forwardly in relation to the direction of gravitational advancement of the goods to be conveyed, and said retarding roller elements being adapted to be displaced upwardly and forwardly by the impact of the goods thereon through a limited distance dependent upon the mass of the goods so as to increase the retarding effect of the retarding roller elements with increase in mass of the goods.

7. In a roller conveyor of the kind comprising a plurality of roller elements mounted rotatably in substantially parallel relationship upon a supporting structure element disposed at an inclination to the horizontal, the provision of a plurality of retarding roller elements mounted rotatably in spaced substantially parallel relationship on the supporting structure element, each of said retarding roller elements comprising a hollow cylindrical shell, a spindle extending longitudinally through the interior of said shell, arms connected rigidly at one end thereof to one end of each spindle, said arms being connected pivotally at their lower ends to said supporting structure element for limited pivotal movement in relation to said supporting structure element about an axis parallel to the axis of rotation of said retarding roller situated below and forwardly of said axis of rotation having regard to the direction of gravitational advancement of the goods along the conveyor, spring means for pivoting said arms and associated retarding roller element in a direction upwardly and forwardly in relation to the supporting structure element, means for limiting said pivotal movement, bearings supporting said shell for rotation concentrically with respect to said spindle, vanes mounted rigidly on each of said spindles within the interior of their respective shells, said vanes extending from said spindle towards the inner surface of said cylindrical shell, said vanes having their outer ends extending forwardly in relation to the normal direction of rotation of said shell and converging towards said shell but spaced therefrom at their extremities so as to provide between each vane and the inner surface of said cylindrical shell a passage of converging form in cross section, and a viscous liquid partially filling the interior of said hollow shell adapted to co-act with said vane extremities and shell interior in inhibiting rotative acceleration of said shell in consequence of the gravitational acceleration of the load traversing the conveyor.

OLAF JOHN BARCLAY ORWIN.

REFERENCES CITED

The following references are of record in the file of this patent:

UNITED STATES PATENTS

| Number | Name | Date |
|---|---|---|
| 268,641 | Dittmar et al. | Dec. 5, 1882 |
| 1,660,512 | Joenicke | Feb. 28, 1928 |
| 1,695,075 | Zimmerman | Dec. 11, 1928 |

FOREIGN PATENTS

| Number | Country | Date |
|---|---|---|
| 646,692 | France | July 17, 1928 |